US012672616B2

(12) United States Patent
Kanade et al.

(10) Patent No.: US 12,672,616 B2
(45) Date of Patent: Jul. 7, 2026

(54) SAPLING PLANTING UNIT

(71) Applicant: Deere & Company, Moline, IL (US)

(72) Inventors: Prashant Kanade, Pune (IN); Syed Gouse Moiddin, Pune (IN); Harshal Deore, Pune (IN); Saurabh Kulhare, Pune (IN); Yuvraj Dhanal, Pune (IN)

(73) Assignee: DEERE & COMPANY, Moline, IL (US)

( * ) Notice: Subject to any disclaimer, the term of this patent is extended or adjusted under 35 U.S.C. 154(b) by 331 days.

(21) Appl. No.: 18/628,897

(22) Filed: Apr. 8, 2024

(65) Prior Publication Data

US 2025/0040494 A1 Feb. 6, 2025

(30) Foreign Application Priority Data

Aug. 6, 2023 (IN) .............................. 202321052767

(51) Int. Cl.
*A01G 23/04* (2006.01)
*A01G 23/00* (2006.01)
(52) U.S. Cl.
CPC .............. *A01G 23/04* (2013.01); *A01G 23/00* (2013.01)
(58) Field of Classification Search
CPC ................................ A01G 23/04; A01G 23/00
See application file for complete search history.

(56) References Cited

U.S. PATENT DOCUMENTS 4,307,827 A * 12/1981 Turunen ............... A01C 11/025
111/104
6,073,564 A * 6/2000 Keskilohko .......... A01C 11/025
414/404

6,941,880 B2 * 9/2005 Culley ................. A01C 11/025
111/105
11,304,362 B2 * 4/2022 Simatovic ............ A01C 11/025
11,445,657 B2 9/2022 Moiddin et al.

FOREIGN PATENT DOCUMENTS

WO WO 2018098576 A1 6/2018
WO WO-2021045666 A1 * 3/2021 ........... A01C 11/025

OTHER PUBLICATIONS

Komatsu Forest presents new automated planter, YOUTUBE, pp. 1-2, [online]. Retrieved from the Internet <URL: https://www.youtube.com/watch?v=NZL0yH1W9Q0>.
Risutec automatic tree planter, YOUTUBE, pp. 1-2, [online]. Retrieved from the Internet <URL: https://www.youtube.com/watch?v=8FmE2w3rQE4>.

* cited by examiner

*Primary Examiner* — Kambiz Abdi

(57) ABSTRACT

A sapling planting unit for a transplanter, the sapling planting unit comprising a power transmitting assembly and a planting tube assembly. The power transmitting assembly provides a movement in a longitudinal direction. The power transmitting assembly comprises a driving element, functionally connected to a power source and a power transmitting mechanism, configured to move along the direction of rotation of the driving element. The planting tube assembly is coupled to the power transmitting mechanism and is configured to be driven in a longitudinal direction. The planting tube assembly comprises a plurality of spades operatively coupled to a planting tube, wherein the planting tube is configured to move in a transverse direction with the help of a first actuating mechanism.

18 Claims, 6 Drawing Sheets

SAPLING PLANTING UNIT

CROSS-REFERENCE TO RELATED APPLICATIONS

This application claims priority under 35 U.S.C. § 119 to patent application IN 202321052767, filed on 6 Aug. 2023, the disclosure of which is incorporated herein by reference.

FIELD OF THE DISCLOSURE

The present disclosure relates to silviculture and more specifically a sapling planting unit of a transplanter for forests.

BACKGROUND OF THE DISCLOSURE

The silviculture process can be slow, cumbersome, and may require careful handling because the process involves planting fragile saplings into the ground. Furthermore, precision in planting depth, subsequent watering, fertilization, water retention around the sapling, and adequate spacing between saplings are some of many variables adding to the complexity to optimize the survival rates and growth of saplings once planted. Saplings can generally be sensitive to environmental conditions, handling, and conditions of planting. Generally done by hand, therein lies a need for an automated or semi-automated process to efficiently and carefully plant a multitude of saplings into the ground to support reforestation efforts.

An automated or semi-automated planting process may aim to plant a maximum number of saplings with high-speed and precision planting operation considering time duration, economy, cost factor, and an availability of manpower, etc. As a part of high-speed and precision planting, the planter vehicle or transplanter needs to store a large volume of saplings, which are brought from the nursery to the planting field. The thousands of saplings typically come in multiple sapling trays. The sapling trays need to be stored and conveyed/transferred to the planting unit (which plants the saplings) in such a manner as not to affect the sapling quality and life. To fulfill such a requirement the planting vehicle or the transplanter needs to have a sapling planting mechanism which can plant saplings with precision and accuracy at a high operating speed. Hence, there is a need for a new sapling planting unit which obviates the problems of the currently available systems.

The present disclosure envisages achieving at least one of the following objects including providing a sapling planting unit for a transplanter which can plant saplings with precision and accuracy at high operating speeds. Another object of the present disclosure is to provide a power transmitting assembly and a planting tube assembly for the sapling planting unit.

Other objects of the present disclosure will be apparent when the description of the disclosure is read in conjunction with the accompanying drawings. The accompanying drawings provided herein are merely illustrative and are not intended to limit the scope and ambit of the present disclosure.

SUMMARY OF THE DISCLOSURE

In accordance with the present disclosure, there is provided a sapling planting unit for a transplanter. The sapling planting unit comprises a power transmitting assembly and a planting tube assembly. The power transmitting assembly is configured to provide a movement in a longitudinal direction. The power transmitting assembly comprises a driving element, a guiding element, and a power transmitting mechanism. The driving element is functionally connected to a power source. The power transmitting mechanism is mounted on the driving element and the guiding element. The power transmitting mechanism is configured to move along the direction of rotation of the driving element. The planting tube assembly is coupled to the power transmitting assembly and is configured to be driven in a longitudinal direction. The planting tube assembly comprises a plurality of spades and a plurality of compactors. The spades are operatively coupled to a planting tube. The planting tube is configured to move in a transverse direction with the help of an actuating mechanism.

The power transmitting assembly is mounted on a first frame having a first guiding provision. The power transmitting mechanism is adjustable with the help of an adjusting unit and the adjusting unit is slidably mounted on the first guiding provision. The planting tube assembly comprises a planting tube, a second frame, a second guiding provision and a funnel. The funnel is mounted at the top end of the second frame. A support mechanism is provided on the planting tube and the support mechanism is configured to move on a second guiding provision in a transverse direction. The present disclosure has several technical advancements, including but not limited to the realization of a sapling planting unit with a power transmitting assembly having a belt as a power transmitting mechanism and configured to provide a longitudinal movement, a sapling planting unit with a planting tube assembly having a planting tube, configured to move in a transverse direction by an actuating mechanism, and the planting tube assembly with a plurality of spades and a plurality of compactors for planting a sapling.

While the foregoing specification has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure which comes within known or customary practice in the art to which this disclosure pertains.

Other features and aspects will become apparent by consideration of the detailed description and accompanying drawings.

Before any embodiments are explained in detail, it is to be understood that the disclosure is not limited in its application to the details of construction and the system of components set forth in the following description or illustrated in the following drawings. The disclosure is capable of other embodiments and of being practiced or of being carried out in various ways. Further embodiments of the disclosure may include any combination of features from one or more dependent claims, and such features may be incorporated, collectively or separately, into any independent claim.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, the term "controller" is a computing device including a processor and a memory. The "controller" may be a single device or alternatively multiple devices.

As used herein, the term "module" refers to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Figure 1:
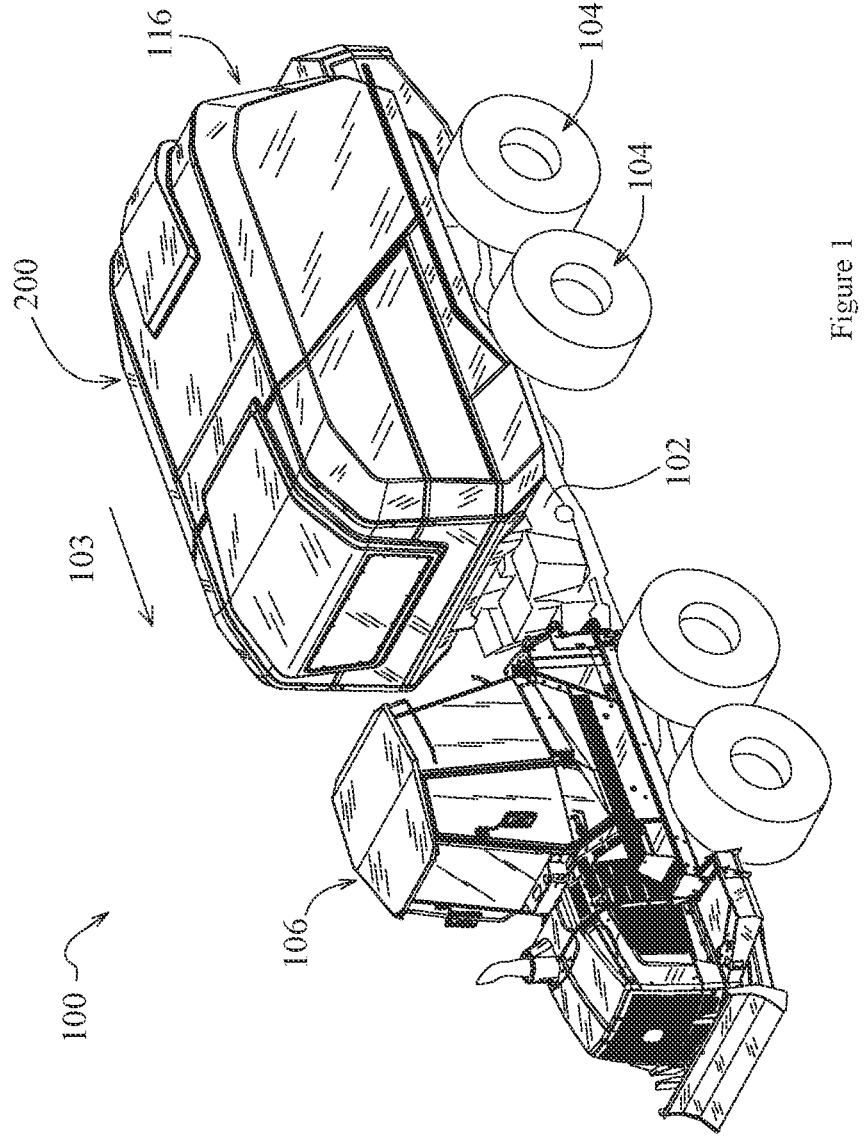
FIG. 1 illustrates a work machine with a transplanter coupled at a rear end.

FIG. 1 illustrates a perspective view of a work machine 100 comprising a sapling transplanter 200. A sapling planting unit 300 (shown in FIG. 2) attached at rear end of the sapling transplanter, according to one embodiment. It is intended that the sapling planting unit 300 provides for continuous sapling planting wherein the work machine 100 continues to advance as the apparatus plants the sapling into the ground, thereby advantageously reducing fuel consumption and increasing efficiency by minimizing a stop/start of the work machine when planting. An alternative embodiment may comprise a sapling transplanter 200 coupled to a work machine, such as a tractor, rather than a singular piece of equipment. Therein, the term work machine may include a transplanter 200 on a work machine 100, or a work machine 100 towing a sapling transplanter 200. Note the sapling planting unit 300 is one of several subcomponents found within the planter vehicle. Furthermore, the terms "work machine," "planter vehicle" and "transplanter" may be used interchangeably throughout this disclosure.

The planter vehicle or work machine 100 may comprise of one or more subcomponents and/or subsystems described herein to automate or semi-automate the sapling planting process. The present disclosure includes a planting vehicle with multiple subsystems. However, used holistically or in part, these subsystems provide an improved process for planting multiple saplings through the automated or a semi-automated process. The work machine 100 may include a chassis 102, ground-engaging supports 104, such as wheels, and a propulsion system (not shown). The propulsion system, such as a diesel engine or motor, or an electric engine provides for motive power driving the wheels and for operating the other components associated with the planter vehicle 100 such as actuators. The operator cab 106, or alternatively a remote operating station (not shown) where an operator sits when operating the work machine 100, includes a user input interface with a plurality of controls (e.g., switches, joysticks, pedals, buttons, levers, display screens, etc.) for controlling the planter vehicle or work machine 100 during operation thereof.

Figure 2:
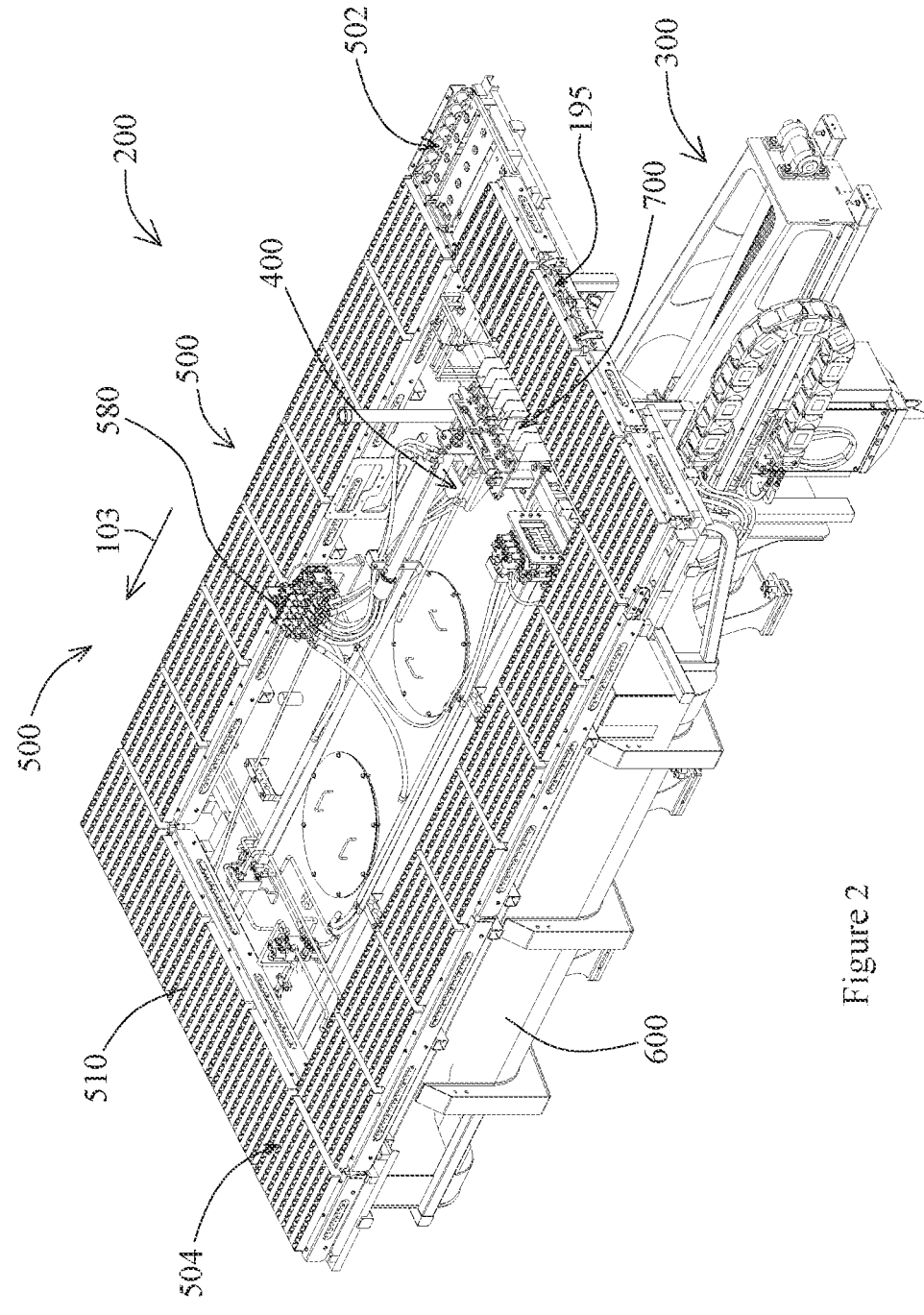
FIG. 2 illustrates a perspective view of the sapling tray handling system attached to the transplanter frame.

As depicted in FIGS. 1 and 2, the forward portion or direction 103 of the planter vehicle or work machine 100 is generally to the left and the rearward portion or direction of the planter vehicle or work machine 100 is generally to the right. The planter vehicle or work machine 100 may include a sapling retrieval apparatus 400 (shown in the FIG. 2), which retrieves saplings from a sapling tray handling system 500 and feeds saplings into the sapling planting unit 300. The planter vehicle or work machine 100 may further include an external housing 116, which generally shields various subcomponents of the planter vehicle from dust, debris, winds, rain, and other harsh environmental conditions. The primary subcomponents and subsystems may include the sapling tray handling system 500, the sapling retrieval apparatus 400, the sapling planting unit 300, the sapling hydrating module 600 (which includes the water tank), and a sapling transfer and indexing system 700.

A controller 180 may have one or more microprocessor-based electronic control units or controllers which perform calculations and comparisons and execute instructions. The controller 180 may also include a processor, a core, volatile and non-volatile memory, digital and analog inputs, and digital and analog outputs. The controller 180 may connect to and communicate with various input and output devices including, but not limited to, switches, relays, solenoids, actuators, light emitting diodes (LED's), liquid crystal displays (LCD's) and other types of displays, radio frequency devices (RFD's), sensors, and other controllers. The controller 180 may receive communication or signals, via electrically or any suitable electromagnetic communication, from one or more devices, determine an appropriate response or action, and send communication or signals to one or more devices. The controller 180 can be a programmable logic controller, also known as a PLC or programmable controller. The controller 180 may couple to a separate work machine electronic control system through a data bus, such as a CAN bus, or the controller 180 can be a part of the work machine electronic control system.

The controller 180 may be in communication with one or more devices including, but not limited to, a vehicle speed sensor to receive information about the vehicle speed, position/proximity sensors to receive various positional inputs about the sapling stock as it moves through the planter vehicle or work machine 100, geo-location sensors to receive information about the planter vehicle's location, obstruction detector sensors, the pump and/or pump controller to provide commands or instructions and/or receive information about direction and flow of hydrating fluid to and from the hydrating fluid storage tank, visual inputs from cameras, and the user input interface to receive commands or instructions and provide feedback. The controller 180 may receive communication from and provide communications, controls, or instructions to any of these devices and any of the subcomponents. This list is not all-inclusive and is detailed further below.

The planting vehicle or work machine 100 may move across a field and retrieve one or more saplings 518 (e.g., a *eucalyptus* tree) from its sapling tray handling unit 500. The planting vehicle or work machine 100 may then plant a sapling 518 into the ground, while watering and or fertilizing the sapling 518. Note that the while the present embodiment demonstrates planting of a single sapling at any given moment, the mechanism can be configured to plant two or more saplings at any given moment. The sapling tray handling system 500 comprises a rectangular loop track 502 to support a multitude of trays 504, the trays 504 collectively have the capacity to hold thousands of saplings 518. The sapling tray handling system 500 comprises a rectangular loop track thereby minimizing the footprint traversing the ground, while maximizing storage capacity of the sapling tray handling system 500 by transferring the plurality of trays within the track on the horizontal plane. A sapling hydrating module 600 is found below the rectangular track to optimize usage of space. Furthermore, the smaller footprint allows for ease of transportation along industry standard roadways when transporting the planter vehicle 100 from a first location to a second location.

The saplings 518 are grouped in trays 510. The sapling tray handling system 500 is configured to convey the trays 510 holding rows of saplings 520 towards the sapling retrieval apparatus 400 (shown in FIG. 2) and indexes to a next tray 510 as each tray is emptied by the sapling retrieval apparatus 400. Trays 510 are replaced by an operator in an access area 195, wherein the operator may reload the sapling tray handling system 500 with a new set of filled trays 510. The trays 510 are removably placed for sliding engagement on roller frames 538 in the track of the sapling tray handling system 500. In an embodiment as shown in FIG. 2 the access area 195 is the same as the pickup area defined by the placement of the sapling retrieval apparatus 400. The pickup area is where the sapling retrieval apparatus 400 may access the saplings 518. The controller 180 is programmed to control operation of the sapling tray handling system 500, wherein the controller 180 actuates a drive mechanism 580 upon receipt of proximity sensor input signals. A plurality of tags including information distinguishing each individual sapling (e.g., an identification code), row of saplings, or tray of saplings 518 from others may be attached to trays, wherein the controller 180 is programmed to record information from a tag reader and process the information as the sapling is planted, thereby correlating the identification code with a geolocation of the sapling 518. This information may be aggregated in memory, thereby mapping productivity as it occurs. In one embodiment, the information can be visually displayed on a user input interface (not shown) as the planter vehicle progresses, or after completion of a sapling lot.

Figure 3:
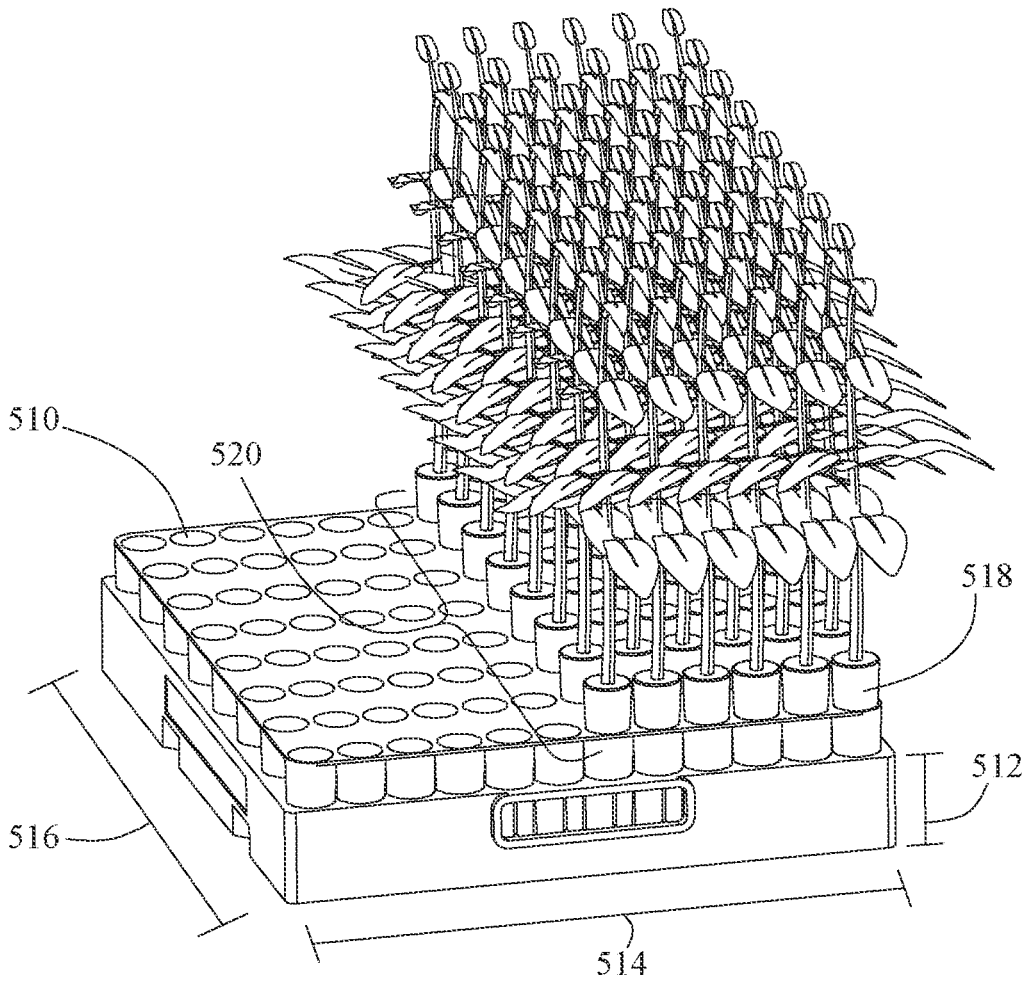
FIG. 3 illustrates a sapling tray partially filled with saplings.

In an embodiment, as shown in FIG. 3 each sapling tray 510 may carry a plurality of saplings 518 in multiple rows 520. Each tray 510 preferably carries eight rows and thirteen columns of saplings 518 thus may accommodate one hundred and four saplings 518. The overall dimensions of the tray 510 including width 516, length 514, and height 512 are optimized to fit into the track 502. In an embodiment the width 516 and length 514 of the tray 510 are approximately equal such that the tray 510 travers the track 502 efficiently. As shown in FIG. 2, the sapling tray handling system 500 may accommodate plurality of sapling trays 504 preferably twenty-three trays and thus may handle 2392 saplings. However, the above numbers are not limiting and may vary according to design and size of the transplanter 200.

As shown in FIG. 2, the track 502 is fixed above the water tank of the hydrating module 600. The track 502 is formed in a rectangular loop form with four sides including a first side 522, a second side 524, a third side 526 and a fourth side 528. In alternative embodiments, the track 502 can be in a square or parallelogram or rhombus forms. Each of the two sides connect to form four corners including a first corner 532, a second corner 534, a third corner 536 and a fourth corner 530 respectively.

Figure 4:
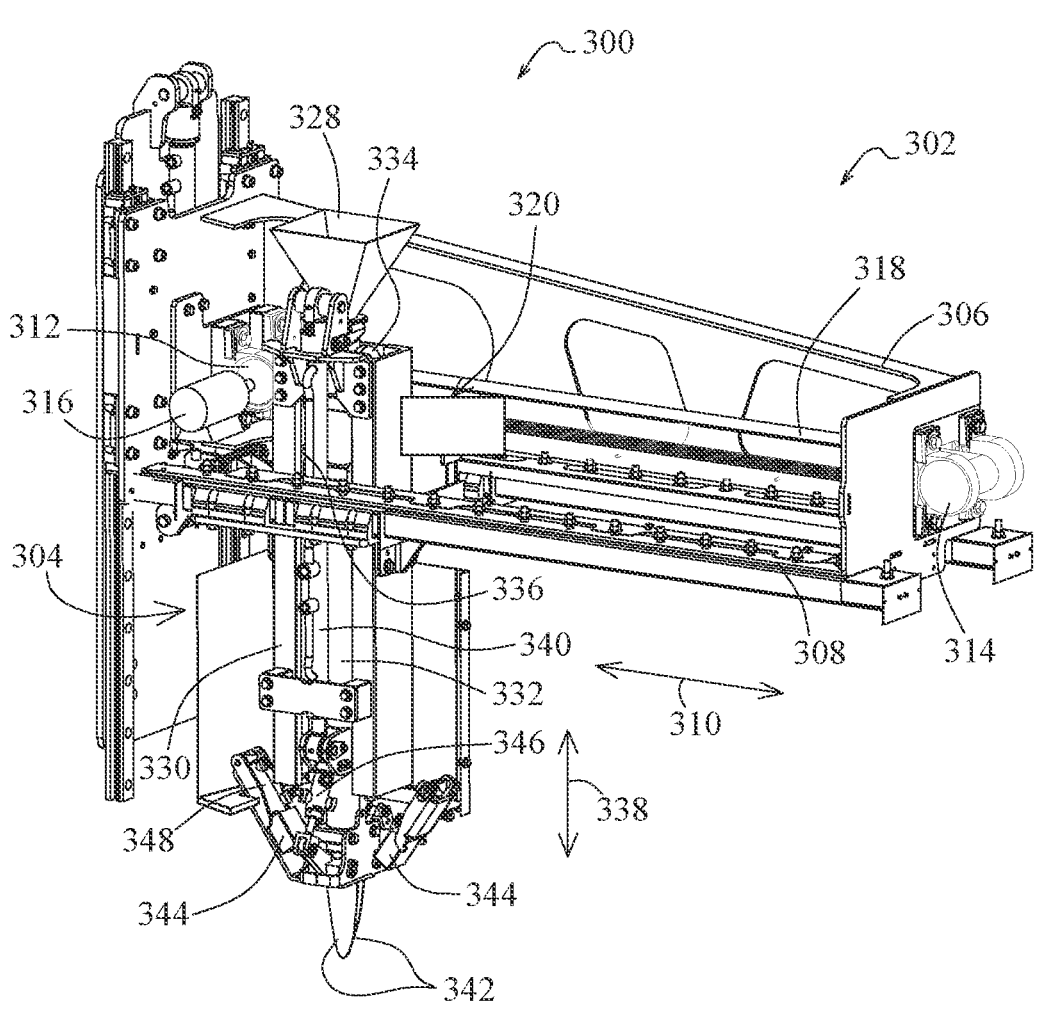
FIG. 4 illustrates a perspective view of a sapling planting unit in a default position.

As shown in FIG. 4, the sapling planting unit 300 comprises a power transmitting assembly 302 and a planting tube assembly 304. In an embodiment, the power transmitting assembly 302 is mounted on a first frame 306 having a first guiding provision 308. The power transmitting assembly 302 is configured to provide a movement in a longitudinal direction 310. The first guiding provision 308 is a linear guide rail however, the linear guide rail may be selected from but not limited to low profile guide, M/V style rail, round shaft linear guides, T-shaped guides, and U-shaped channel. Further, the power transmitting assembly 302 comprises a driving element 312 and a guiding element 314. In an embodiment, the driving element 312 and the guiding element 314 are mounted on the first frame 306. The driving element 312 and the guiding element 314 are a pulley. Alternatively, the driving element 312 and the guiding element 314 may be a sprocket, a gear or any such suitable mechanism. The driving element 312 is functionally connected to a power source 316. In an embodiment, the power source is a motor and may be selected from but not limited to hydraulic motor, electric motor, and a pneumatic motor. Further, a power transmitting mechanism 318 is mounted on the driving element 312 and the guiding element 314. The power transmitting mechanism 318 is configured to move along the direction of rotation of the driving element 312. In an embodiment, the power transmitting mechanism 318 is a belt however, the belt may be selected from but not limited to round belt, flat belt, V belt, toothed belt, and link belt. Alternatively, the power transmitting mechanism 318 may be chain, rope, cable or any such suitable mechanism. The power transmitting mechanism 318 is provided with an adjusting unit 320. The adjusting unit 320 slides along the first guiding provision 308. In an embodiment, the adjusting unit 320 comprises a fixed member and a movable member connected with a screw to adjust tension of the belt or power transmitting mechanism 318 and avoid slacking during operation. Alternatively, the belt or power transmitting mechanism 318 may be adjusted by a spring-loaded tensioner or a floating tensioner.

FIG. 4 shows a planting tube assembly 304 of the sapling planting unit 300. The planting tube assembly 304 is coupled to the power transmitting assembly 302. In an embodiment, the planting tube assembly 304 is coupled to the adjusting unit 320. Alternatively, the planting tube assembly 304 may be directly coupled to the belt or power transmitting mechanism 318. The planting tube assembly 304 is slidably mounted on the first guiding provision 308 of the first frame 306 and is configured to move in the longitudinal direction 310. The planting tube assembly 304 comprises a second frame 330 and a planting tube 332 mounted on the second frame 330. Also, a funnel 328 is mounted at the top end of the second frame 330 for receiving a sapling 518. The planting tube 332 is configured to removably fit at a bottom of the funnel 328. The planting tube 332 is coupled with a support mechanism 334. The support mechanism 334 is configured to move on a second guiding provision 336 of the second frame 330 and in a transverse direction 338. In an embodiment, the second guiding provision 336 is a linear guide rail however, the second guiding provision 336 may be selected from but not limited to a low profile guide, a M/V style rail, a round shaft linear guide, a T-shaped guide, and a U-shaped channel. In an embodiment, the support mechanism 334 is a roller bearing however, the support mechanism 334 may be selected from but not limited to a ball bearing and a needle bearing. The planting tube 332 is moved by the first actuating mechanism 340 interposed between the planting tube 332 and the second frame 330. In an embodiment, the first actuating mechanism 340 is a linear actuator and may be selected from but not limited to hydraulic actuators, electric actuators, and pneumatic actuators. However, any other kind of actuator can be used to operate the movement of the planting tube 332. The linear actuator 340 is positioned vertically and provides movement of the planting tube 332 in the transverse direction 338 relative to the second frame 330.

Figure 6:
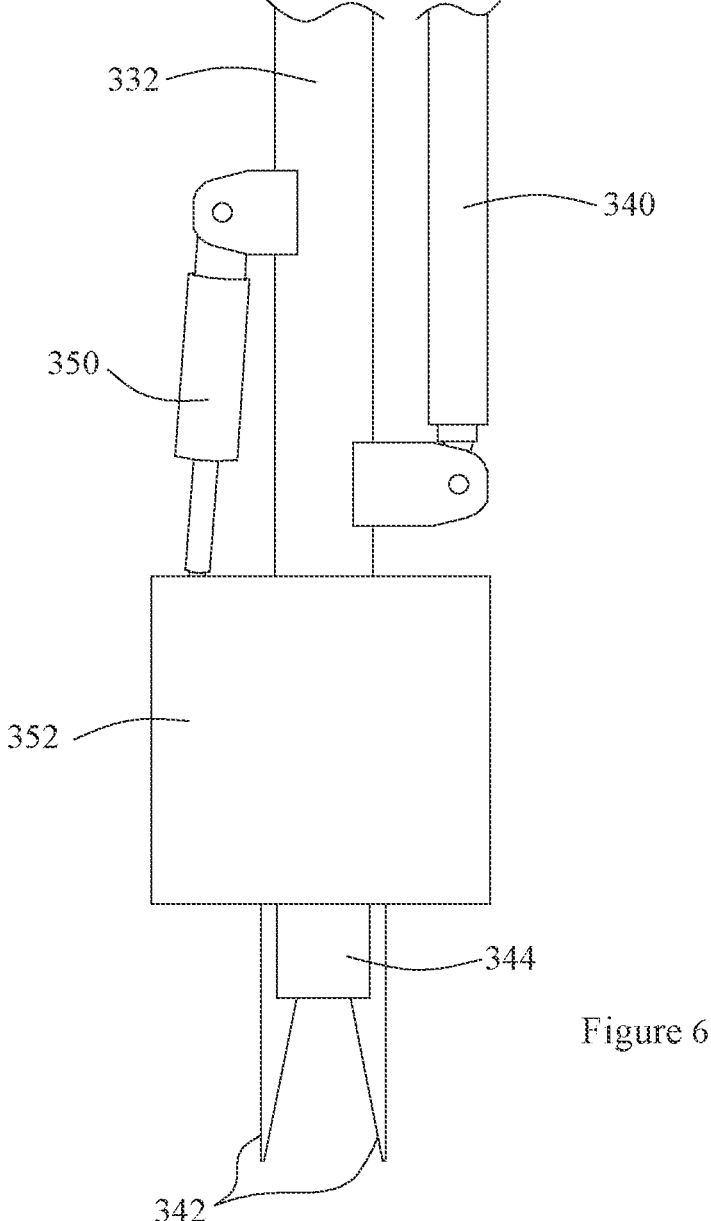
FIG. 6 illustrates an embodiment for operating spades and compactors with an actuator and a linkage mechanism.

The planting tube assembly 304, shown in FIG. 4 comprises a plurality of spades 342 and a plurality of compactors 344. In an embodiment the plurality of spades 342 is operatively coupled to a planting tube 332. The plurality of spades 342 is pivotably coupled to the planting tube 332 and is operated by the second actuating mechanism 346. The second actuating mechanism 346 is interposed between the planting tube 332 and the plurality of spades 342. In an embodiment, there are two spades placed opposite to each other. The planting tube assembly 304 further comprises a plurality of compactors 344 and is operated by a third actuating mechanism 348. The third actuating mechanism 348 is interposed between the second frame 330 and the compactors 344. In an embodiment, there are two compactors placed in juxtaposition. The compactors 344 are configured to extendable towards the ground by the third actuating mechanism 348. Alternatively, the compactors 344 are extended angularly with respect to the planting tube 332. The spades 342 and the compactors 344 are configured to be operable in perpendicular plane. In an embodiment, the second actuating mechanism 346 and the third actuating mechanism 348 are linear actuators and may be selected from but not limited to, hydraulic actuators, electric actuators, and pneumatic actuators. However, any other kind of actuators can be used to operate the movement of the spades 342 and the compactors 344. In an alternate embodiment as shown in FIG. 6, the spades 342 and the compactors 344 are operated by an actuator 350 and a linkage mechanism 352. The spades 342 and the compactors 344 are interlinked with the help of the linkage mechanism. An extension and a retraction of the actuator 350 is configured to operate the linkage mechanism.

The operation of the actuating mechanism 340, 346, and 348 is determined based on any signal or information received from the vehicle speed sensor, the position or proximity sensor(s), or the geo-location sensors or combination(s) thereof by the controller 180.

During operation, the planting tube assembly 304 is at a default position as shown in FIG. 4. The controller 180 is provided to control operation of the power transmitting assembly 302 and the planting tube assembly 304.

The sapling planting unit 300 comprises the planting tube 332 configured for delivering the saplings towards the ground, wherein the spades 342 are configured for penetrating the ground for planting the sapling 518. The compactors 344 are configured to extend towards the ground to compact the ground and assists in removing the accumulation of air from the ground near the sapling 518. However, the sapling planting unit 300 of the present embodiment may enable zero drag onto the sapling 518. A moving speed of the planting tube assembly 304 and speed of travel of the transplanter 100 are synchronized.

The transplanter 100 advantageously achieves a stationary or nearly stationary planting condition wherein a portion of the sapling planting unit 300 moves an equal and opposite direction to the chassis 102 propel direction such that the planting tube 332 containing sapling is stationary with respect to the ground when planting. As a first step, the sapling planting unit 300 receives an individual sapling in the planting tube 332 through the funnel 328 as saplings 518 are released from the indexing unit. Driving the belt or power transmitting mechanism 318 translates the planting tube 332 in a first direction. This first direction may generally be opposite the direction of travel of the chassis 102.

Figure 5:
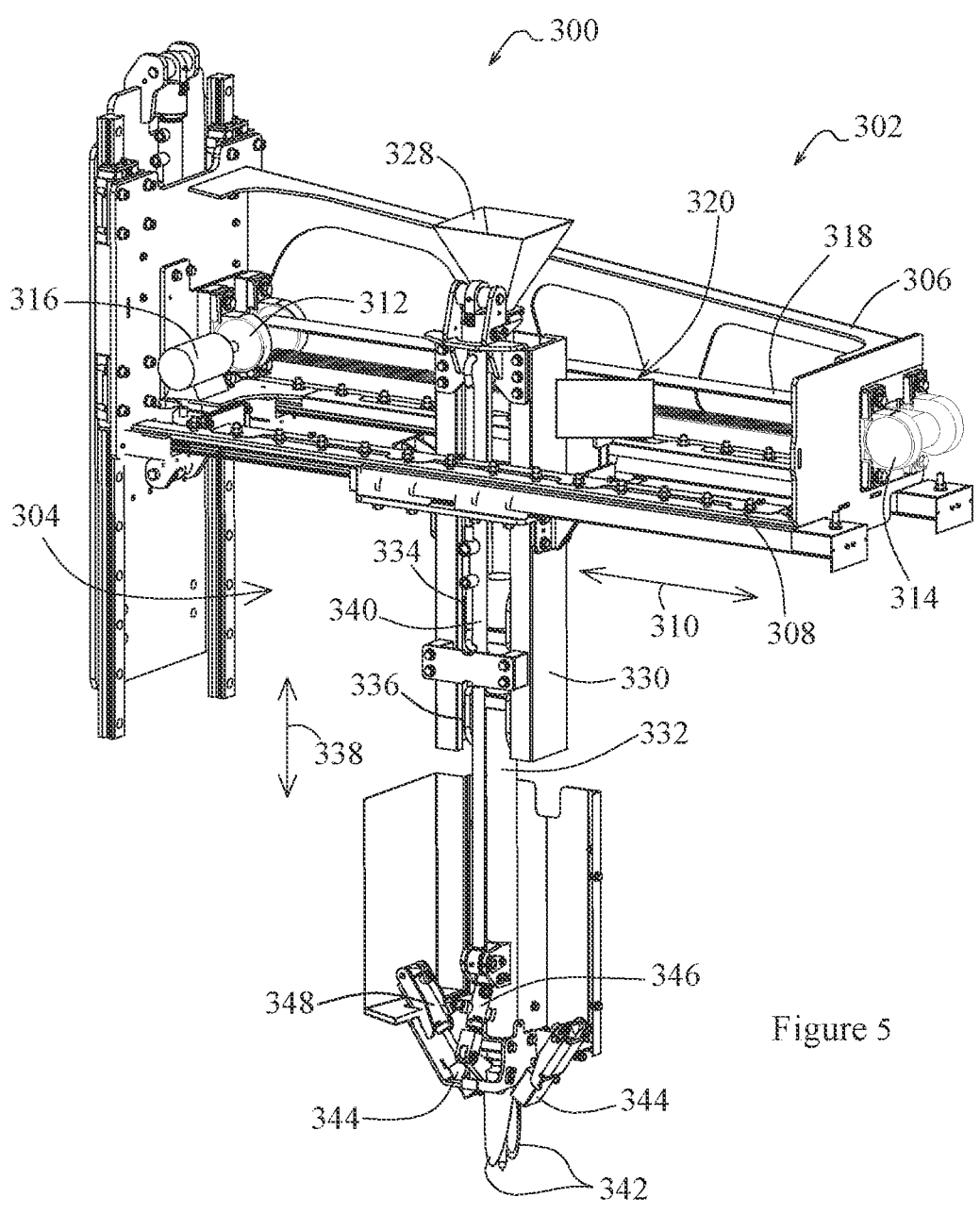
FIG. 5 illustrates a perspective view of a sapling planting unit with a planting tube extended towards the ground.

With the planting tube 332 being moveable in a transverse direction 338 by the first actuating mechanism 340, the sapling planting unit 300 advantageously maintains ground clearance when not planting, penetrates the soil with an impactful force with the momentum acquired from movement of the planting tube 332. The controller 180 operates the first actuating mechanism 340 to move the planting tube 332 from a rest position towards the ground as shown in FIG. 5. The controller 180 controls speed and position of the belt or power transmitting mechanism 318 and the first actuation mechanism 340.

Upon planting the sapling 518 into the ground, the belt or power transmitting mechanism 318 translates in a reverse direction, the reverse direction being opposite the first direction, after the planting tube 332 has begun to retract in an upward direction toward the rest position. Again, the planting tube 332 retracts upwards towards the rest position using the first actuating mechanism 340. The planting tube 332 may or may not completely retract to the rest position as the sapling planting unit 300 plants a first sapling 518, and subsequent saplings 518 because the extent of retraction depends on cycle times of sapling 518 planting, and/or speed of the transplanter 100.

In a first step of the planting cycle wherein the planting tube 332 is in a retracted position at rest position, sapling 518 is received in the funnel 328 from the indexing unit. The spades 342 are in the closed position and the compactors 344 are in retracted position. In a second step of the planting cycle wherein the planting tube 332 impacts the ground as the first actuating mechanism 340 extend the planting tube 332 to engages the ground. At this point, the sapling has dropped with gravitational force, to be released by the spades 342. The spades 342 pivotably rotate to open, and a cavity is made by the spades 342 in the ground and release sapling 518 into the cavity. The compactors 344 extend and compacts the ground neat the sapling 518. The controller 180 controls operation of the plurality of spades 342 and the plurality of compactors 344. Next step is retraction of the planting tube 332 towards the rest position and during the same duration, the belt or power transmitting mechanism 318 bring back the planting tube 332 position to the default position.

Various features are set forth in the following claims.

What is claimed is:

1. A sapling planting unit for a transplanter, the sapling planting unit comprising:
   a planting tube assembly comprising a plurality of spades coupled to a planting tube, the planting tube configured to be moved in a transverse direction by a first actuating mechanism; and
   a power transmitting assembly coupled to the planting tube assembly, the power transmitting assembly comprising:
   a driving element coupled to a power source, and
   a power transmitting mechanism coupled to the driving element and a guiding element, wherein the power transmitting mechanism comprises an adjusting unit and the adjusting unit is configured to slide along the first guiding provision, wherein the adjusting unit is configured to adjust the tension of the power transmitting mechanism, the power transmitting mechanism configured to move along the direction of rotation of the driving element and configured to drive the planting tube assembly in a longitudinal direction.

2. The sapling planting unit of claim 1, wherein the planting tube assembly is coupled to the power transmitting mechanism.

3. The sapling planting unit of claim 1, wherein the power transmitting assembly is coupled to a first frame having a first guiding provision.

4. The sapling planting unit of claim 1, wherein the driving element and the guiding element comprise a pulley and the power transmitting mechanism comprises a belt.

5. The sapling planting unit of claim 3, wherein the planting tube assembly is slidably mounted on the first guiding provision of the first frame.

6. The sapling planting unit of claim 5, wherein the planting tube assembly is coupled to the adjusting unit.

7. The sapling planting unit of claim 1, wherein the planting tube assembly comprises a second frame and the planting tube is coupled to the second frame.

8. The sapling planting unit of claim 1, wherein a support mechanism is provided on the planting tube and the support mechanism is configured to move on a second guiding provision in a transverse direction.

9. The sapling planting unit of claim 8, wherein the support mechanism comprises a plurality of roller bearings.

10. The sapling planting unit of claim 1, wherein the first actuating mechanism is interposed between the planting tube and the second frame and is configured to move the planting tube.

11. The sapling planting unit of claim 1, wherein the first actuating mechanism comprises a linear actuator.

12. The sapling planting unit of claim 11, wherein the linear actuator is positioned vertically and arranged to provide movement to the planting tube in the transverse direction relative to the second frame.

13. The sapling planting unit of claim 1, wherein the plurality of spades are pivotably coupled to the planting tube and are operable by a second actuating mechanism, which is interposed between the planting tube and the spades.

14. The sapling planting unit of claim 1, wherein the planting tube assembly comprises a plurality of compactors and are operable by a third actuating mechanism, which is interposed between the second frame and the compactors.

15. The sapling planting unit of claim 13, wherein the plurality of spades and the plurality of compactors are configured to be operated by an actuator and a linkage mechanism.

16. The sapling planting unit of claim 1, wherein a controller is provided to control operation of the power transmitting assembly and the planting tube assembly.

17. The sapling planting unit of claim 1, wherein the controller is configured to control speed and position of the power transmitting mechanism and the first actuation mechanism.

18. The sapling planting unit of claim 1, wherein the controller is configured to control operation of the plurality of spades and the plurality of compactors.

* * * * *